United States Patent
Katsaros

(10) Patent No.: US 9,284,984 B2
(45) Date of Patent: Mar. 15, 2016

(54) ROLLING ELEMENT BEARING CAGE SECTION, ROLLING-ELEMENT BEARING CAGE, AND ROLLING-ELEMENT BEARING

(71) Applicant: Aktiebolaget SKF, Göteborg (SE)

(72) Inventor: Padelis Katsaros, Schweinfurt (DE)

(73) Assignee: AKTIEBOLAGET SKF, Goteborg (SE)

( * ) Notice: Subject to any disclaimer, the term of this patent is extended or adjusted under 35 U.S.C. 154(b) by 0 days.

(21) Appl. No.: 14/298,330

(22) Filed: Jun. 6, 2014

(65) Prior Publication Data
US 2014/0363114 A1    Dec. 11, 2014

(30) Foreign Application Priority Data
Jun. 6, 2013    (DE) .......................... 10 2013 210 523

(51) Int. Cl.
| | |
|---|---|
| *F16C 33/66* | (2006.01) |
| *F16C 33/78* | (2006.01) |
| *F16C 33/46* | (2006.01) |
| *F16C 33/56* | (2006.01) |
| *F16C 43/04* | (2006.01) |
| *F16C 19/38* | (2006.01) |
| *F16C 33/60* | (2006.01) |

(52) U.S. Cl.
CPC ......... *F16C 33/6648* (2013.01); *F16C 33/4635* (2013.01); *F16C 33/56* (2013.01); *F16C 33/6611* (2013.01); *F16C 33/7893* (2013.01); *F16C 19/386* (2013.01); *F16C 33/60* (2013.01); *F16C 43/04* (2013.01)

(58) Field of Classification Search
CPC ................. F16C 33/46–33/4682; F16C 33/44; F16C 33/6648; F16C 33/6611; F16C 33/7893; F16C 19/386; F16C 43/04
See application file for complete search history.

(56) References Cited

U.S. PATENT DOCUMENTS

| | | |
|---|---|---|
| 3,759,592 A | 9/1973 | Carlson |
| 4,243,276 A | 1/1981 | Persson et al. |
| 5,399,026 A | 3/1995 | Witte |
| 5,529,401 A | 6/1996 | Gabelli et al. |
| 5,918,986 A * | 7/1999 | Matsui et al. ............... 384/470 |
| 2007/0280572 A1 | 12/2007 | Coicaud |
| 2011/0255816 A1 | 10/2011 | Foertschbeck |
| 2012/0328225 A1 | 12/2012 | Ito et al. |

FOREIGN PATENT DOCUMENTS

| | | |
|---|---|---|
| DE | 10151263 A | 4/2003 |
| DE | 202007000001 U1 | 5/2007 |

(Continued)

*Primary Examiner* — Alan B Waits
(74) *Attorney, Agent, or Firm* — Bryan Peckjian; SKF USA Inc. Patent Dept.

(57) ABSTRACT

A rolling-element bearing cage section for a rolling-element bearing is configured to guide at least one rolling element between a first and a second rolling-element bearing ring of the rolling-element bearing. The rolling-element bearing cage section is configured to partially or completely receive the at least one rolling element prior to installation in the rolling-element bearing. The rolling-element bearing cage section includes a porous material adapted to absorb a lubricant and release the lubricant as a result of a centrifugal force acting on the lubricant during rotation of the rolling-element bearing cage section, thus allowing a liquid lubricant to be used in a rolling-element bearing without the need for complex seals.

13 Claims, 2 Drawing Sheets

(56) References Cited

FOREIGN PATENT DOCUMENTS

| | | |
|---|---|---|
| DE | 102007044014 A | 3/2009 |
| DE | 102007044127 A | 3/2009 |
| EP | 0654613 A | 5/1995 |
| EP | 1956256 A | 8/2008 |
| FR | 2914031 A | 9/2008 |
| GB | 478825 A | 1/1938 |
| JP | 2000120707 A | 4/2000 |
| JP | 2008215418 A | 9/2008 |
| JP | 2008215419 A | 9/2008 |

* cited by examiner

ROLLING ELEMENT BEARING CAGE SECTION, ROLLING-ELEMENT BEARING CAGE, AND ROLLING-ELEMENT BEARING

CROSS-REFERENCE

This application claims priority to German patent application no. 10 2013 210 523.1, filed on Jun. 6, 2013, the contents of which are fully incorporated herein by reference.

TECHNOLOGICAL FIELD

Exemplary embodiments relate to a rolling-element bearing cage section, a rolling-element bearing cage, and a rolling-element bearing, which can be used, for example, as a wheel bearing for a motor vehicle such as an automobile, a truck, or a commercial vehicle.

BACKGROUND

Rolling-element bearings are used in many areas of technology to guide and support two components that rotate relative to each other. One of the components is often immobile, fixed in space, or stationary relative to a machine with which it is used or connected. The component may be, for example, the housing of the machine or another equivalent or corresponding component. In the motor vehicle field, the component may be a transmission housing, an engine block, or an axle, shaft or other wheel support. Alternately, the rolling-element bearing can be a transmission bearing (a bearing for a transmission shaft), an engine bearing (a bearing that supports a shaft or other rotating part of an engine), or a wheel bearing. But similar challenges also arise in other fields of machine, factory, and vehicle engineering, and rolling-element bearings are used in those fields as well.

In contrast to large bearings, such as are used, for example, in the wind power field, various lubricating concepts are often used in compact bearings. These bearings are often implemented as sealed bearings, bearings into which the required lubricant has been introduced during manufacturing or during assembly of the bearing. In this way lubrication can be provided for the entire service life of the bearing (for-life lubrication) or, alternatively, for a certain operating period, after which the lubricant must be changed during a servicing. Grease is often used as a lubricant in sealed bearings because grease can be more easily prevented from leaking from the rolling-element bearing than can lubricating oil.

Using grease as a lubricant is not always an optimal choice. Grease generally comprises an oil bound up or emulsified in a carrier such a soap. Under the influence of shear forces, the oil leaves the carrier and becomes available for lubrication. However, as these shear forces may only be applied to the portions of the grease near a moving surface, only a small part of the oil bound in the grease is used for actual lubrication. The remainder of the oil typically remains passive and unused in regions of the grease which are not located in the immediate vicinity of the work surfaces or contact surfaces. A not-insignificant proportion of the grease used in the rolling-element bearing thus may not contribute to lubrication, but nonetheless its presence increases the mass of a rolling-element bearing.

Liquid lubricants, on the other hand, mix and coat surfaces better than grease due to their lower viscosities, and they are used more efficiently when introduced into a rolling-element bearing. Because of their lower viscosity, however, liquid lubricants require a more expensive or complex seal to prevent them from leaking out of the rolling-element bearing.

SUMMARY

There is therefore a need to provide a rolling-element bearing that can use a liquid lubricant without the need for expensive liquid-impermeable seals. This problem is addressed by embodiments of the present disclosure.

A rolling-element bearing cage (or cage section) according to an exemplary embodiment is formed to guide at least one rolling element during a movement thereof between a first and a second rolling-element bearing ring of a rolling-element bearing. The rolling-element bearing cage section is further configured to partially or completely accommodate/receive/retain the at least one rolling element prior to installation in the rolling-element bearing. The rolling-element bearing cage section further comprises a porous material which is formed or adapted to absorb/take up or be impregnated with lubricant and to release the lubricant during rotation of the rolling-element bearing cage section due to a centrifugal force acting on the lubricant.

An exemplary embodiment of a rolling-element bearing cage section is thus based on the recognition that a rolling-element bearing can be provided that enables, with a constructively simple configuration, the use of a liquid lubricant. This is due to the fact that the rolling-element bearing cage section is comprised of a porous material that absorbs the liquid lubricant and that releases it again due to a centrifugal force acting on the liquid lubricant during rotation of the rolling-element bearing cage section. Of course a liquid-impermeable seal can nonetheless be used.

The lubricant can be a liquid lubricant based, for example, on an oil, but also on another material. Of course the lubricant can also be a lubricant having a higher viscosity than an oil. By using a rolling-element bearing cage section according to an exemplary embodiment, the use of expensive or complex liquid-impermeable seals can optionally be limited while still avoiding the problem of the mixing and coating of the lubricant being limited due to a sharp increase in the viscosity of the lubricant, such that a non-use of a certain portion of the lubricant can possibly result.

The rolling-element bearing cage section is formed to partially or completely accommodate/receive the at least one rolling element prior to an installation in the rolling-element bearing. It is thus a component or a section of a component which is produced in advance of the manufacture/assembly of the rolling-element bearing and that can serve at least partially for guiding and/or accommodating/receiving the at least one rolling-element bearing. In a rolling-element bearing cage section according to an exemplary embodiment, a rolling-element bearing cage section can thus be formed such that it receives at least one rolling element thereby allowing it to be handled together with the rolling-element bearing cage section prior to installation in the rolling-element bearing. In other words, the at least one rolling element can be connected to the rolling-element bearing cage section in question by a snap-fit, a latching, or another mechanical, for example interference-fit, connection which nonetheless allows a movement of the rolling-element bearing. In this way, during installation the rolling element or rolling elements can assume a position relative to the rolling-element bearing cage section which differs from a later operating position. As used herein, a "friction-fit" connection results from static friction, a "materially-bonded" connection results from molecular or atomic interactions and forces, and an "interference-fit" connection results from a geometric connection of the respective connecting partners.

The rolling-element bearing cage section can optionally be further formed to absorb/receive/retain/accommodate collected lubricant when stationary/stopped/idling. It can thus be possible to further simplify the sealing technology used in the rolling-element bearing. Lubricant that collects in the region of the rolling-element bearing cage section can optionally be absorbed/received therefrom before it can escape through the seal of the rolling-element bearing. In this way it is possible to absorb/receive the lubricant spatially near the at least one rolling element and release it again when required, i.e. during rotation of the rolling-element bearing.

In a rolling-element bearing, the rolling-element cage section can optionally be designed for a lubricant which includes oil. Accordingly the porous material can be an oil-resistant material which can alternatively or additionally be temperature resistant up at least 120° C. A rolling-element bearing cage section according to an exemplary embodiment can thereby also optionally be used in the field of highly loaded applications where the associated rolling-element bearing is exposed to high mechanical or other loads which cause it to heat up. Exemplary embodiments can thus be used as wheel bearings for a motor vehicle, for example an automobile, a truck, or another commercial vehicle. Appropriate wheel bearings can also be used for rail cars or other machines, such as construction machines.

In a rolling-element bearing according to an exemplary embodiment, the porous material can optionally comprise a body of polyethylene, polypropylene, polyamide, polycarbonate, polystyrene, polyurethane, and/or styrene-acrylonitrile copolymer, which body of material may be foamed in a suitable manner to produce open and/or semi-open pores therein. It can thereby be possible to use a mechanically and/or chemically stable porous material for a rolling-element bearing cage section with which the service life of a rolling-element bearing can potentially be extended.

In a rolling-element bearing cage according to an exemplary embodiment the porous material can be at least partially, possibly completely, an open-pore material. In this way the absorbing and/or release of the lubricant may be improved.

A rolling-element bearing cage according to an exemplary embodiment comprises at least one rolling-element bearing cage section according to an exemplary embodiment.

A rolling-element bearing cage according to an exemplary embodiment can be embodied as a one-piece component or it may comprise a plurality of rolling-element bearing cage segments such that the rolling-element bearing cage segments of the plurality of rolling-element bearing cage segments comprise at least one rolling-element bearing cage section. Here a "one-piece component" is understood to mean a component which is manufactured from one continuous piece of material. The term "one-piece" can therefore be synonymously used with the terms "integral" or "one-part." A rolling-element bearing cage according to an exemplary embodiment can thus be embodied as a one-part component or as a multi-part component.

A rolling-element bearing according to an exemplary embodiment comprises a rolling-element bearing cage according to an exemplary embodiment in which the maximum uptake/retention/accommodation amount of the lubricant of the rolling-element bearing cage exceeds the total filling capacity of the rolling-element bearing with the lubricant. The sealing technology which is used in the rolling element bearing can thereby optionally be simplified such that in the idle or stationary state the lubricant may be substantially completely absorbed/received/retained/accommodated in the rolling-element bearing cage sections of the rolling-element bearing cage. In the idle or stationary state the rolling element bearing can thus be "dry" despite the implementation or usage of a liquid lubricant. During operation the lubricant can be released from the rolling-element bearing cage due to the rotation of the rolling-element bearing and its components.

In a rolling-element bearing according to an exemplary embodiment, the lubricant can be a liquid. The rolling-element bearing can include a seal which is liquid-permeable when the second rolling-element bearing ring is stationary with respect to the first rolling-element bearing ring. By using a rolling-element bearing according to an exemplary embodiment, the sealing technology used can thus be simplified. In this way it can be possible to use a non-contacting seal, such as a gap seal or a labyrinth seal. It can thereby optionally be possible to reduce the friction of the rolling-element bearing during operation. Additionally or alternatively it can also be possible to use for this purpose a simpler and thus possibly less expensive seal in a rolling-element bearing according to an exemplary embodiment.

A rolling-element bearing according to an exemplary embodiment can optionally include at least one seal which is disposed on an axial end of the rolling-element bearing and the rolling-element bearing cage extends at least substantially up to the seal. It can thereby be possible to reduce a free volume of the rolling-element bearing in order to improve the receiving/absorbing and the releasing of the lubricant. Also or in addition, thermal expansion of a quantity of air located in the rolling element bearing may thereby be reduced by reducing the free interior volume due to the thus-designed rolling-element bearing cage.

In a rolling-element bearing according to an exemplary embodiment the seal can optionally include a recess/opening on a side facing the rolling-element bearing cage into which recess/opening the rolling-element bearing cage at least partially extends. An absorbing effect of the porous material of the rolling-element bearing cage or its rolling-element bearing cage sections can thus be used in the region directly on/at the seal in order to absorb the lubricant prior to a possible escape.

In a rolling-element bearing including an exemplary embodiment of the rolling-element bearing cage, the free bearing volume can optionally drop to at most 25% of a free comparison bearing volume which corresponds to the free bearing volume of the rolling-element bearing without the rolling-element bearing cage. In other words, the cage may fill up to at least 75% of the space between the bearing rings and between the individual rolling elements. In other exemplary embodiments the rolling-element bearing cage can also be formed such that it reduces the free bearing volume to at most 20%, at most 15%, or at most 10% of the free comparison bearing volume. It can thereby be possible to reduce an expansion of air located in the bearing so that pressure fluctuations caused by a change of an operating temperature of the rolling-element bearing open a seal to a lesser extent and/or for a shorter period of time (e.g., when a pressure inside the rolling-element bearing is higher than the ambient pressure) or an adherence of the seal to one of the bearing rings (e.g., when a pressure inside the rolling-element bearing is lower than the ambient pressure). In this way the operational reliability of the rolling-element bearing may be improved overall over a larger range of operating parameters.

A rolling-element bearing according to an exemplary embodiment may comprise a plurality of rows of rolling elements and have a rolling-element bearing cage configured to guide the plurality of rows of rolling elements during movement. The rolling-element bearing cage may thus serve to guide more than one row of rolling elements. The rolling-element bearing cage can be used for guiding two or even more rows of rolling elements. Additionally or alternatively a plurality of rolling-element bearing cages can also be implemented in a rolling-element bearing according to en exemplary embodiment; by using such rolling-element bearing cages a plurality of rows of rolling elements can be guided. In other words, additionally or alternatively the rolling-element bearing can comprise one or more additional rows of rolling elements which are guided by one or more additional rolling-element bearing cages.

In a rolling-element bearing according to an exemplary embodiment the rolling-element bearing cage can optionally be formed such that it has a smallest spacing separating the rolling elements retained therein, which smallest spacing does not exceed 20% of a smallest diameter of a rolling element of the plurality of rolling elements. In other exemplary embodiments the smallest spacing may not exceed 15%, 10%, or 5% of the smallest diameter of a rolling-element bearing retained therein. It can thereby also be possible to reduce a free bearing volume, without however having to take into account a significant functional impairment of the rolling-element bearing cage. In this way the absorbing and/or releasing of the lubricant can be improved. Additionally or alternatively the quantity of air enclosed in the rolling-element bearing can also be reduced, thus reducing the likelihood of problems caused by an overpressure or an underpressure in the rolling-element bearing in question, as has already been described above.

BRIEF DESCRIPTION OF THE DRAWINGS

Exemplary embodiments are described and explained in more detail below with reference to the accompanying Figures.

DETAILED DESCRIPTION

Figure 1:
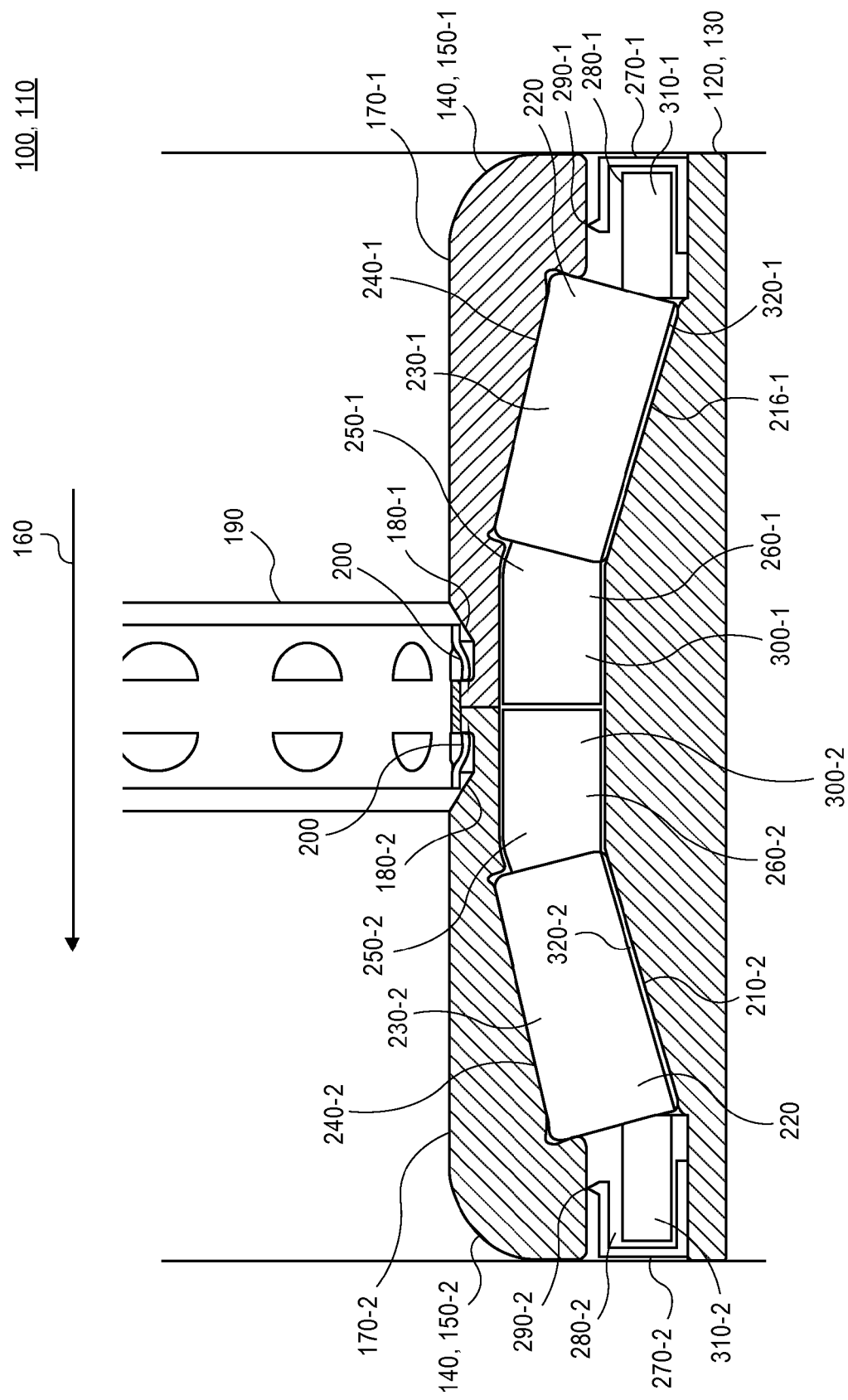
FIG. 1 is a cross-sectional view through a rolling-element bearing according to an exemplary embodiment.

In the following description of the accompanying figures, which show embodiments of the present disclosure, identical reference numbers are used to indicate identical or comparable components. Furthermore, summarizing reference numbers may be used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

As has already been briefly explained, rolling-element bearings are used in many areas of technology where two components that rotate relative to each other are to be guided or supported with respect to their rotational movement. Rolling-element bearings used in motor vehicles or other machines are an example thereof. Thus rotational movement of a driveshaft or output shaft relative to an underlying vehicle are appropriately supported in many motor vehicles, but also in rail cars or construction machines, in the region of their drive units. This rotational movement—facilitated by bearings—is transmitted along the drive train out to the drive wheels. Appropriate bearings may also be located at different points along the drive train via which corresponding rotational movements are guided.

An example is represented by wheel bearings, which are used, for example, in the previously mentioned motor vehicles, i.e. for example in automobiles, trucks, or other commercial vehicles. Corresponding wheel bearings can be used both for driven and non-driven wheels.

The aforementioned bearings are often, though not exclusively, rolling-element bearings in which a plurality of rolling elements roll between a first rolling-element bearing ring and a second rolling-element bearing ring. Such rolling elements are in contact with corresponding raceways of the rolling-element bearing rings.

In order to reduce wear, corresponding rolling-element bearings often contain a lubricant which may be selected for the specific design and use of the respective rolling-element bearing. An appropriate lubrication can thus be effected, for example by an appropriate lubrication system. However, in many applications, in particular in wheel bearings for motor vehicles, such a solution is not generally used.

Lubrication for the entire service life of a bearing (for-life lubrication) or also lubrication for a certain operating period is generally preferred in these contexts, and a sealing of the bearing with respect to the surrounding environment is achieved by using one or more seals. Accordingly, such rolling-element bearings are sometimes referred to as "bearing units" or as "sealed bearing units".

The lubrication of sealed bearing units is often accomplished using grease lubricants. In this case the grease is retained in the interior of the bearing unit. Grease leakage is prevented by the above-mentioned seal. Conventional grease is chosen as the lubricant instead of oil because it can be sealed more easily against escape, i.e. leakage from the bearing unit. In principle, even with a grease lubrication, the oil bound in the grease is often responsible and appropriate for the lubrication. Under pressure and flexing or shear force, this oil is released from the grease and then serves to lubricate the contact surfaces. Although there is a relatively large amount of grease in a bearing unit, often only a small amount of the grease, the portion located near contact zones, is used for actual lubrication. The remainder of the grease often remains passive and unused in regions which are disposed more distant from the working contact surfaces, and oil is not released from this remainder of the grease. If the relatively small amount of grease in the region of the contact zones is "bled out," i.e., if all of its oil has been released and used, it is time for a change of grease or possibly/optionally a bearing change. Oil which has been released by the grease is unlikely to be reabsorbed by the grease.

In addition, a more-or-less large quantity of air is often located in the corresponding bearing units, which quantity of air expands during heating. This expansion can generate an overpressure in the bearing unit, which, depending on the seal design, either increases the pressure on the sealing lip and thus increases the friction and the wear, or even allows the sealing lip to open, allowing the heated air to escape from the bearing.

Another possibility is that when the air in the interior of the bearing unit cools, the sealing lip may pressed against the opposing surface which increases friction and wear. When air is escaping from the bearing unit there is also the risk that lubricant will be released to the environment. On the other hand, when air is escaping, contaminants can enter the bearing due to an entry of moisture or water.

FIG. 1 shows a cross-sectional view through a rolling-element bearing 100 according to an exemplary embodiment, specifically a wheel bearing 110 of a motor vehicle. The rolling-element bearing 100 comprises a first bearing ring 120, which in this embodiment is a one-part outer ring 130, and a second bearing ring 140, specifically a two-part inner ring 150, which comprises two inner rings 150-1, 150-2 disposed along an axial direction 160 of the rolling-element bearing 100. The inner ring 150 and the outer ring 130 may be provided independently of each other, and either ring may be configured to be a stationary ring or a rotating ring. In this case the axial direction 160 coincides with an axis of rotation of the rolling-element bearing 100 or its two bearing rings 120, 140.

The two inner rings 150-1, 150-2 each have a recess 180-1, 180-2 on a radially-inner-lying surface 170-1, 170-2 to allow them to be connected to each other. A connecting element 190 engages these recesses 180-1, 180-2 using projections 200. In this case, the connecting element 190 is substantially annular. Together with the recesses 180 and the projections 200, the connecting element 190 ensures a mechanical connection of the inner rings 150-1, 150-2.

The rolling-element bearing 100 shown in FIG. 1 is a double row tapered roller bearing. The first bearing ring 120 accordingly has two raceways 210-1, 210-2 on which each rolling element 220 of a first row of rolling elements 230-1 and of a second row of rolling elements 230-2 roll during a movement of the first bearing ring 120 relative to the second bearing ring 140. The second bearing ring 140 accordingly also has corresponding raceways 240-1 and 240-2 with which the rolling elements 220 are also in contact. During operation of the rolling element bearing 100, i.e. the above described movement of the two bearing rings 120, 140 with respect to each other, the rolling elements 220 roll on these raceways 240-1 and 240-2.

The rows of rolling elements 230 extend and circulate around the axial direction 160. In order to prevent the rolling elements 220 from contacting one another, the rolling-element bearing 100 includes a rolling-element bearing cage 250. More specifically the exemplary embodiment includes a rolling-element bearing cage 250-1, 250-2. The rolling-element bearing cages 250 each comprise a rolling-element bearing cage section 260-1 in the case of the rolling-element bearing cage 250-1, or 260-2 in the case of the rolling-element bearing cage 250-2.

The rolling-element bearing cage sections 260 shown in FIG. 1 substantially coincide with the respective rolling-element bearing cages 250. The rolling-element bearing cages 250 shown here are thus one-piece rolling-element bearing cages 250.

The rolling-element bearing cages 250 are configured such that they can either partially or completely receive/accommodate the rolling element or rolling elements 220 prior to installation in the rolling-element bearing 100. Thus the respective rolling-element bearing cage 250 can optionally be equipped with rolling elements 220 prior to installation in the rolling-element bearing 100.

The rolling-element bearing cage section 260 comprises a porous material which is formed to absorb/uptake/be impregnated with an appropriate lubricant and release the lubricant during rotation of the rolling-element bearing cage section 260 due to a centrifugal force acting on the lubricant. Accordingly the porous material of the rolling-element bearing cage section 260 can also reabsorb lubricant that collects at the bearing cage section 260 during stoppage. For this purpose the porous material can, for example, be an at least partially, but also completely, open-pore foam or a correspondingly open-pore material. This material may be manufactured from polyethylene, polypropylene, polyamide, polycarbonate, polystyrene, polyurethane, and/or styrene-acrylonitrile copolymer, and thus comprise one or more of these materials or also be comprised of one or more of these materials. Of course the rolling-element bearing cage section 260 can also be manufactured completely from the porous material.

A rolling-element bearing cage section 260 or a rolling-element bearing cage 250 can also be manufactured from a different material than those mentioned above. Depending on the specific implementation, area of use, and intended operating conditions, it may be advisable to use a material which is chemically stable with respect to the lubricant used. If, for example the lubricant used is an oil, it may be advisable to use a porous material which is oil-resistant. In order to enable use in more highly loaded bearings, it can also be of interest, in addition or alternatively, to use a material having a sufficient temperature stability or temperature resistance. Thus it may be advisable to use a material that is temperature-resistant up to at least 120° C. In this way usage under difficult conditions, such as in the case of a wheel bearing, can be made possible.

Depending on the material used and the lubricant used, the average diameters of the pores can be chosen, for example, to be between 20 and 100 µm or between 20 and 150 µm, i.e. for example 40 µm. Average pore diameter is calculated according to any convention method of calculating pore diameter in one of the materials described above. In this way a free volume of the rolling-element bearing cage sections 260 or of the corresponding rolling-element bearing cages 250 can optionally be achieved which falls in the range between 40% and 50%. Of course, however, larger or smaller average pore diameters as well as correspondingly differing free volumes can also optionally be used. Here "free volume" refers to the portion of the volume of the rolling-element bearing cage 250 or of the corresponding rolling-element bearing cage section 260 which is "taken up" by the pores. In other words, the volume which is filled by the corresponding material takes up the difference with respect to 100% from the respective rolling-element bearing cage 250 or the corresponding rolling-element bearing cage section 260.

Before the specific geometric design of the rolling-element bearing cage in the present disclosure is described in more detail, it should be noted that the rolling-element bearing 100 is sealed—in the present case on both sides—along the axial direction 160 by seals 270-1, 270-2. The seals 270-1, 270-2 each have a substantially U-shaped profile that forms a recess 280-1, 280-2 facing the rolling-element bearing cage 250. The seals 270 are mechanically connected to the outer ring 130, i.e. to the first bearing ring 120, for rotation therewith. They accordingly have at least one sealing edge 290-1, 290-2, also referred to as a sealing lip, which abuts on the respective inner ring 150-1, 150-2, i.e. the second bearing ring 140. The seals 270 thus form, via the sealing edges 290, a closing or a sealing of an internal volume ("lubricating volume") of the respective rolling-element bearing 100 with respect to its environment. Because the sealing edges 290 are in contact with the second bearing ring 140, the seals 270 are referred to as "contact seals".

In the exemplary embodiment of FIG. 1, the rolling-element bearing cages 250 extend at least partially into the recesses 280 of the respective seals 270. The rolling-element bearing cages 250 may extend into the recesses 280 to a lesser extent in other exemplary embodiments. Alternately, if the rolling-element bearing cages 250 do not extend into the recesses they can extend at least substantially up to the corresponding seals 270.

Other seals 270 can also be used in a rolling-element bearing 100 according to an exemplary embodiment, for example, contactless seals, i.e. for example gap seals or labyrinth seals. However, more complex seals can also be used alternatively or additionally in the context of a rolling-element bearing 100 according to an exemplary embodiment.

As was briefly explained above, the rolling-element bearing cages 250 shown in FIG. 1 are formed substantially as one-piece elements and coincide substantially with the rolling-element bearing cage sections 260-1, 260-2. However, in the exemplary embodiment shown here the individual rolling-element bearing cage sections 260 comprise a first subsection 300, a second subsection which directly connects to the first subsection 300 and is in contact therewith, but is not shown in FIG. 1, and a third subsection 310, which is also in contact with the not-shown second subsection or manufactured as a single piece therewith. The first subsection 300 extends in the interior of the rolling-element bearing 100 along the axial direction 160 substantially from the contact edge of the two inner rings 150-1, 150-2 up to the corresponding rolling elements 220. The first subsection 300 substantially completely fills the interior along the radial direction, which is perpendicular to the axial direction, so that a clearance between the rolling-element bearing cage and the corresponding adjacent components is reduced as much as possible to a minimum. In other words, the rolling-element bearing cages 250 are formed such that a minimum distance to one of the rolling-element bearing rings 120, 140 does not exceed a value which corresponds to 20% of a minimum diameter of a rolling element 220. In other exemplary embodiments the first subsection 300 can accordingly be formed such that the minimum distance does not exceed 15%, 10%, or 5% of the smallest diameter of the rolling elements 220.

The second subsection, which is not shown in FIG. 1, serves not least for the actual guiding of the rolling elements 220 and for their spacing in the interior of the rolling-element bearing 100. The second subsection can thus for example comprise one or more bars/crossbars/crosspieces/bridges by which the rolling elements 220 are held in a spaced manner in the circumferential direction of the rolling-element bearing 100. The second subsections are the portions of the rolling-element bearing cage that extend circumferentially between the rolling elements.

The second subsection finally proceeds into the previously-mentioned third subsection 310, which also extends in the axial direction 160 starting from the rolling elements 220 into the recesses 280 of the seals 270. However, the third subsections 310 can vary to some degree with respect to their radial extension. It may be advisable to arrange the third subsections 310 closer to an outer radial end of the rolling-element bearing cage 250. In this way a receiving/absorbing of lubricant collected in the interior can be simplified, as has already been explained in more detail in particular in connection with FIG. 2 and the lubricant level indicated there.

The second subsection also has a corresponding geometric design so that the distance between the second subsection and a further component of the rolling-element bearing, for example one of the bearing rings 120, 140, can be kept as small as possible. Thus a line 320 is shown in FIG. 1 which indicates a cage outer surface or a contour of a pocket or window for receiving/accommodating at least one rolling element in the region of the second subsection. This line 320 extends substantially parallel to the respective raceways 210 or 240 (not shown in FIG. 1) of the two bearing rings 120, 140. In this way a clearance between the cage outer surface and the corresponding raceways 210, 240 of the outer ring 130 or the inner ring 150 is reduced to a smallest-possible value. If the rolling-element bearing cage 250 in this region is manufactured, for example, from a porous material, the lubricant absorption and/or lubricant release can be effected, directly in the region of the rolling elements, in which region there is also a corresponding lubricant requirement during the operation of the rolling-element bearing 100.

The design of the rolling-element bearing cages 250 thus makes it possible for the free bearing space in the interior of the rolling-element bearing 100 (the lubricating space) to be filled as completely as possible by the respective rolling-element bearing cage or cages 250. Since the cage here is at least sectionally manufactured from a porous material, the air volume of the rolling-element bearing 100 can thus be significantly reduced. In some exemplary embodiments the free bearing volume can thus optionally be reduced to at most 25% of a free comparison volume which corresponds to the free bearing volume of the rolling-element bearing 100 without the respective rolling-element bearing cage or cages 250. In other exemplary embodiments this value can be reduced to at most 20%, at most 15%, or at most 10%. In this way the rolling-element bearing cages 250 can be used, for example, not only for receiving/absorbing and releasing of the lubricant; the volume of air located in the rolling-element bearing 100 can also be reduced. The above-described problem of a quantity of air in the interior of the rolling-element bearing 100 heating and then possibly re-cooling can in this way at least be mitigated.

The rolling-element bearing cage 250 of the rolling-element bearing 100, as is shown for example in FIG. 1, can thus be manufactured or produced from a sponge-type plastic which, for example, is impregnated/soaked/saturated with a lubricating oil or another lubricant which can be a liquid. The rolling-element bearing cage can then be shaped in such a manner that it is positioned relatively close to the stationary or rapidly rotating components of the rolling-element bearing cage, even optionally lightly contacting them. In addition to its main task of guiding the rolling elements 220, the rolling-element bearing cage 250 makes it possible during stoppage of the bearing to soak up/absorb, like a piece of sugar or a sand cube or a sponge, lubricant (e.g. lubricating oil) that has collected near the rolling-element bearing cage 250 due to the porous structure of the rolling-element bearing cage 250. During rotation of the rolling-element bearing cage 250 the rolling-element bearing cage can release, i.e. spin-off, the absorbed lubricant under the influence of the centrifugal force acting on the lubricant. The rolling-element bearing cage 250 can be dimensioned such that as much free bearing volume as possible is occupied by the rolling-element bearing cage 250.

A rolling-element bearing cage section 260 or a rolling-element bearing cage 250 can thus improve the lubrication of or simplify the sealing technology used in a rolling-element bearing 100. Thus the lubricating of sealed bearing units can optionally be improved. Additionally or alternatively it may be possible to reduce pressure fluctuations and the consequences thereof, (which pressure fluctuations occur in the interior of such units due to temperature-induced changes of the air volume or of the air density) by replacing a conventional rolling-element bearing cage with a rolling-element bearing cage having at least one rolling-element bearing cage section 260 which, as a porous, for example, sponge-type cage, serves both as an oil reservoir and as an air displacer in such a sealed bearing unit.

In the rolling-element bearing 100 as shown in FIG. 1 it can be useful to dimension the maximum uptake/retention/accommodation amount of lubricant of the rolling-element bearing cage 250 such that it exceeds the total lubricant filling capacity of the rolling-element bearing 100. In this way it may be possible to reduce standing pools of lubricant in the interior of the rolling-element bearing 100, or optionally to completely avoid them. It thus may be possible to design the seals 270 of the rolling-element bearing 100 more simply (because there are no standing pools of liquid to leak between the permeable seals). Such a rolling-element bearing 100 can thus include a seal 270 which may be liquid-permeable when the first bearing ring 120 is stationary with respect to the second bearing ring 140 (or would be liquid permeable if a rolling-element bearing cage 250 according to an exemplary embodiment were not present). The contact/contacting seal shown in FIG. 1 may thus be replaced by a contactless seal. For example, gap seals and/or labyrinth seals can be considered as contactless seals.

Figure 2:
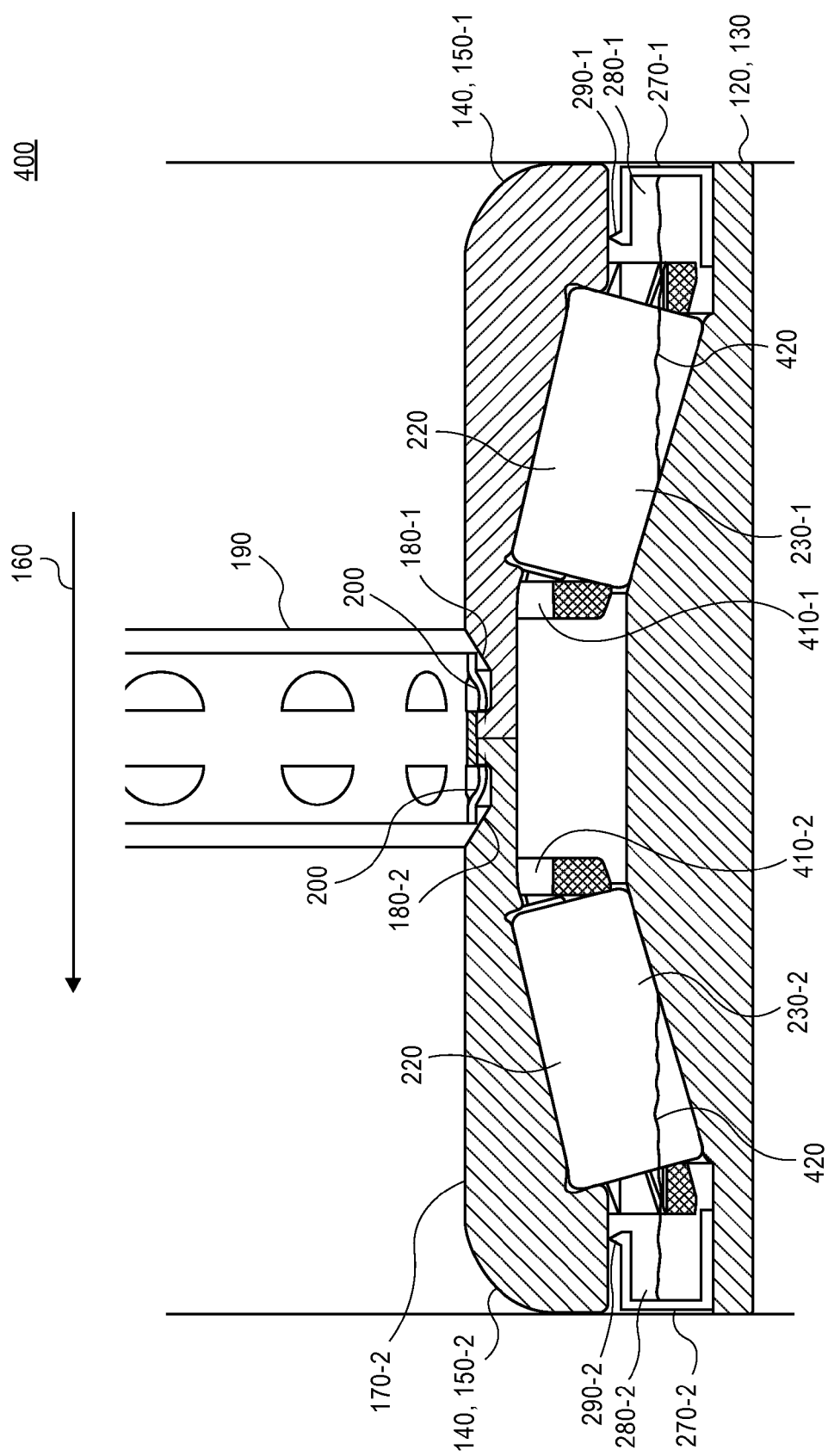
FIG. 2 is a cross-sectional view through a comparison rolling-element bearing including a conventional rolling-element bearing cage.

FIG. 2 illustrates a comparative example of a wheel bearing 400 which is related to the rolling-element bearing 100 according to an exemplary embodiment shown in FIG. 1. It differs in essence from the rolling-element bearing 100 shown in FIG. 1 in that two conventional rolling-element bearing cages 410-1, 410-2 are used instead of the two rolling-element bearing cages 250-1, 250-2 according to an exemplary embodiment. The wheel bearing 400 accordingly has a much larger interior volume in its interior which is occupied by air. This air can accordingly be heated during a corresponding heat development in the interior of the wheel bearing 400 and lead to a strong tendency for the air to flow out to the environment through the seals 270 in order to bring about a corresponding pressure equalization.

In addition, FIG. 2 shows a liquid level 420 which can form in the interior of the wheel bearing 400 during stoppage of the bearing. It is thus a liquid level which can prevail in the interior of the wheel bearing 400 if no cage 250 according to an exemplary embodiment is used. Thus FIG. 2 shows that, particularly in the region of the recesses 280 of the two seals 270, a not-insignificant quantity of the lubricant (e.g. oil) collects during stoppage of the wheel bearing. Not least for this reason the exemplary embodiment of a rolling-element bearing cage shown in FIG. 1 includes the third subsection 310 exactly in the region of the recesses 280. Using this subsection 310 lubricant which has collected in the region of the recesses 280 can be received/absorbed during the stoppage.

Due to the presence of the sponge-type rolling-element bearing cage 250 or the sponge-type cages 250, in many exemplary embodiments, the lubricant, i.e. the lubricating oil, is only released during rotation of the rolling-element bearing cage 250. The lubricant thus only circulates freely when it is actually needed for lubrication purposes. The seals, in turn, do not need to seal against stationary oil (oil in a stationary bearing unit) with respect to an escape from the rolling-element bearing 100 according to an exemplary embodiment. Of course the seals 270 can be designed accordingly.

A rolling-element bearing 100 according to an exemplary embodiment can thus essentially be sealed as though it were grease-lubricated, since the sponge-type cage 250 soaks up/reabsorbs the oil during stoppage or at very low rotational speeds. This arrangement therefor simulates a hypothetical grease which, unlike actual grease, can be regenerated, that is, a grease in which oil is reabsorbed after it has been released.

In addition, due to the reduced bearing clearance/free space, there is less air present that can expand inside the bearing unit, so the technical challenges of addressing an overpressure or underpressure in the rolling-element bearing 100, and thus the pressure problem in the region of the sealing lips or sealing edges 290, can be mitigated.

Of course, exemplary embodiments of a rolling-element bearing 100, of a rolling-element bearing cage 250, and of corresponding rolling-element bearing cage sections 260 can be implemented in a variety of different embodiments. Thus, for example, instead of two one-part rolling-element bearing cages 250-1, 250-2 as shown in FIG. 1, a rolling-element bearing cage 250 according to an exemplary embodiment can also have more than one row 230 of rolling elements 220. In such a case the separation of the two rolling-element bearing cages 250-1, 250-2, which separation can be seen in FIG. 1, can optionally be omitted.

As a further alternative, instead of a one-part or one-piece rolling-element bearing cage 250, a rolling-element bearing cage 250 built from rolling-element bearing cage segments can also be implemented. Here each, or at least a plurality, of the rolling-element bearing cage segments can comprise at least one rolling-element bearing cage section 260 according to an exemplary embodiment, which rolling-element bearing cage section 260 thus comprises a porous material in the manner described.

Of course, in addition exemplary embodiments of a rolling-element bearing 100, rolling-element bearing cages 250, and corresponding rolling-element bearing cage sections 260 are by no means limited to double row tapered roller bearings. In principle any type of rolling element bearings 100 can be embodied according to an exemplary embodiment, provided it generally includes a cage. Thus, for example, spherical rolling elements, cylindrical rolling elements, needle-shaped rolling elements, barrel-shaped rolling elements, or other rolling elements can be used instead of conical rolling elements. Rolling-element bearings 100 according to an exemplary embodiment can also of course be implemented as single row rolling-element bearings, but also as multi-row rolling-element bearings. Different types of bearings can also optionally be used in a rolling-element bearing 100 according to an exemplary embodiment. Thus in addition to a plurality of rolling elements which are divided between one or more rows 230 of rolling elements 220, additional rolling elements can optionally be implemented in one or more further rows 230 of rolling elements, which rolling elements can differ with respect to their arrangement and/or design from the aforementioned rolling elements. These can also be guided by a rolling-element bearing cage 250 according to an exemplary embodiment.

As has already been explained, rolling-element bearings 100 according to an exemplary embodiment can make possible the use of a liquid lubricant without the expense or complexity of construction having to be significantly increased. A liquid lubricant can therefore be used in a rolling-element bearing 100 having a structurally simpler seal. Of course more complex seals, which can for example comprise secondary/buffer seals, can nonetheless be implemented depending on the application.

By using an exemplary embodiment it can optionally be possible to use, with constructively simple means (e.g., a seal of relatively simple construction), a liquid lubricant in the context of a rolling-element bearing 100.

The features disclosed in the foregoing description, the following claims, and the accompanying Figures can be meaningful and can be implemented both individually as well as in any combination for the realization of an exemplary embodiment in its various embodiments.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubrication for rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Rolling-element bearing
110 Wheel bearing
120 First bearing ring
130 Outer ring
140 Second bearing ring
150 Inner ring
160 Axial direction
170 Radial surface
180 Recess
190 Connecting element
200 Projection
210 Raceway
220 Rolling elements
230 Row of rolling elements
240 Raceway
250 Rolling-element bearing cage
260 Rolling-element bearing cage section
270 Seal
280 Recess
290 Sealing edge
300 First subsection
310 Third subsection
320 Line
400 Wheel bearing
410 Conventional rolling-element bearing cage
420 Liquid level

What is claimed is:

1. A rolling-element bearing cage for a rolling-element bearing, which is formed to guide at least one rolling element, during a movement thereof, between a first and a second rolling-element bearing ring of the rolling-element bearing,
    wherein the rolling-element bearing cage is formed to partially or completely receive the at least one rolling element prior to installation in the rolling-element bearing;
    wherein the rolling-element bearing cage comprises a porous material which is formed to absorb a lubricant and to release the lubricant again due to a centrifugal force acting on the lubricant during rotation of the rolling-element bearing cage;
    wherein the rolling-element bearing cage is configured to absorb collected lubricant when stationary, during a stoppage of the bearing; and
    wherein the porous material of the rolling-element bearing cage section is configured to absorb a volume of lubricant that exceeds a maximum volume of lubricant disposable between the first and second rolling-element bearing rings of the rolling-element bearing; and
    at least one seal disposed on an axial end of the rolling-element bearing, and wherein the rolling-element bearing cage extends at least substantially up to the seal.

2. The rolling-element bearing cage according to claim 1, embodied as one-piece or comprising a plurality of rolling-element bearing cage segments.

3. The rolling-element bearing according to claim 1, wherein the lubricant is a liquid and wherein the rolling-element bearing includes at least one seal which is liquid-permeable.

4. The rolling-element bearing according to claim 1, wherein the seal has a recess on a side facing the rolling-element bearing cage, and the rolling-element bearing cage extends at least partially into the recess.

5. The rolling-element bearing according to claim 1, wherein the rolling-element bearing cage is radially spaced apart from at least one rolling-element bearing ring of the rolling-element bearing, such that a smallest spacing between the at least one rolling-element bearing ring and the rolling-element bearing cage does not exceed 20% of a smallest diameter of the at least one rolling-element.

6. The rolling-element bearing cage according to claim 1, further including at least one seal disposed on an axial end of the rolling-element bearing, and
    wherein the lubricant is a liquid,
    wherein the rolling-element bearing includes at least one seal which is liquid-permeable,
    wherein the seal has a recess on a side facing the rolling-element bearing cage, and
    wherein the rolling-element bearing cage extends at least partially into the recess.

7. The rolling-element bearing according to claim 1, wherein the rolling-element bearing cage occupies at least 75% of an annular space extending radially from the first rolling-element bearing ring to the second rolling-element bearing ring, and axially along an entirety of the first rolling-element bearing ring.

8. A rolling-element bearing comprising:
    a first rolling-element bearing ring;
    a second rolling-element bearing ring;
    at least one rolling element disposed between the first rolling-element bearing ring and the second rolling-element bearing ring for allowing the first rolling-element bearing ring to rotate relative to the second rolling-element bearing ring;
    a rolling-element bearing cage for guiding the at least one rolling element;
    a first seal located proximate to a first axial side of the first rolling-element bearing ring and a first axial side the second rolling-element bearing ring; and
    a second seal located proximate to a second axial side of the first rolling-element bearing ring and a second axial side of the second rolling element bearing ring, the first and second axial sides of the first rolling-element bearing ring being at opposite axial extents of the first rolling element-bearing ring, and the first and second axial sides of the second rolling-element bearing ring being at opposite axial sides of the second rolling-element bearing ring, wherein the first rolling-element bearing ring comprises a first ring-shaped surface that extends axially from the first axial side of the first rolling-element bearing ring to the second axial side thereof, and the second rolling-element bearing ring comprises a second ring-shaped surface that extends axially from the first axial side of the second rolling-element bearing ring to the second axial-side thereof, wherein an interior volume is defined extending radially from an entirety of the first ring-shaped surface to an entirety of the second ring-shaped surface, and wherein a lubricating space comprises an entirety of the interior volume that is not occupied by any other components of the rolling-element bearing, wherein the rolling-element bearing cage is disposed within the interior volume and comprises a porous material configured to absorb lubricant from the lubricating space and to release the lubricant in response to a centrifugal force produced by rotation of the rolling element bearing cage, and wherein the porous material is configured to absorb a volume of lubricant that is greater than or equal to a total volume of the lubricating space.

9. The rolling-element bearing according to claim 8, wherein at least one of the first seal or the second seal is liquid-permeable.

10. The rolling-element bearing according to claim 9, wherein the porous material is positioned to prevent liquid in the lubricating space from leaking through the at least one of the first or second seals.

11. The rolling-element bearing according to claim 8, wherein at least one of the first seal or the second seal includes a recess, and wherein a portion of the rolling-element bearing cage projects into the recess.

12. The rolling-element bearing according to claim 8, wherein at least one of the first seal or the second seal includes an axially extending recess, and wherein an axial end portion of the rolling-element bearing cage projects axially into the recess.

13. The rolling-element bearing according to claim 8, wherein the rolling element cage occupies at least 75% of the interior volume.

* * * * *